United States Patent [19]

Lewis et al.

[11] Patent Number: 5,438,081

[45] Date of Patent: Aug. 1, 1995

[54] MICROWAVE-ACTIVATED PREPARATION OF SILICONE FOAMS, AND COMPOSITIONS USEFUL THEREIN

[75] Inventors: Larry N. Lewis, Scotia; William N. Schultz, Niskayuna; Lionel M. Levinson, Schenectady; Chris A. Sumpter, Scotia; Judith Stein, Schenectady, all of N.Y.

[73] Assignee: General Electric Company, Schenectady, N.Y.

[21] Appl. No.: 325,913

[22] Filed: Oct. 20, 1994

[51] Int. Cl.[6] ............................ C08F 2/46; C08G 7/06; C08J 9/02
[52] U.S. Cl. ........................... 522/99; 521/84.1; 521/86; 521/93; 521/109.1; 521/110; 521/122; 521/124; 521/154; 522/81; 528/15; 528/31; 528/32
[58] Field of Search ............... 521/84.1, 93, 86, 110, 521/122, 124, 154, 109.1; 528/15, 31, 32; 522/81, 99

[56] References Cited

U.S. PATENT DOCUMENTS

| 4,026,843 | 5/1977 | Kittle | 521/154 |
|---|---|---|---|
| 4,026,844 | 5/1977 | Kittle et al. | 521/154 |
| 4,840,974 | 6/1989 | Gross et al. | 521/85 |
| 5,019,295 | 5/1991 | Yoshida et al. | 521/154 |
| 5,025,073 | 6/1991 | Lewis et al. | 528/31 |
| 5,041,466 | 8/1991 | Takahashi et al. | 521/91 |
| 5,089,582 | 2/1992 | Lewis | 528/31 |
| 5,106,939 | 4/1992 | Sumpter et al. | 528/31 |

*Primary Examiner*—Morton Foelak
*Attorney, Agent, or Firm*—William H. Pittman

[57] ABSTRACT

Silicone foams are prepared by microwave curing of a mixture of at least one polyorganosiloxane having vinyl groups attached to silicon; at least one hydride polysiloxane; a blowing agent comprising water and, preferably, at least one monohydroxyaliphatic compound, a cyclodextrin inclusion compound of a platinum group metal coordination complex (preferably with a cyclic diene) and a filler. The use of the inclusion compound as a catalyst increases the shelf life of the composition, whereupon curing and foaming occur together upon exposure to microwave radiation.

10 Claims, No Drawings

MICROWAVE-ACTIVATED PREPARATION OF SILICONE FOAMS, AND COMPOSITIONS USEFUL THEREIN

BACKGROUND OF THE INVENTION

This invention relates to the preparation of silicone foams, and more particularly to a method for their preparation which employs microwave radiation.

As used herein, the term "silicone foam" designates a polyorganosiloxane composition in the form of a foam. Silicone foams are well known in the art and their preparation is described in a number of patents. A method of high current interest involves contact in a one-part mixture between a polyorganosiloxane having vinyl groups attached to silicon, a polysiloxane having hydrogen atoms attached to silicon and a hydroxy compound. Upon contact with a platinum group catalyst, two reactions occur: hydrosilylation of the vinyl groups by interaction with the silicon-hydrogen moieties, and generation of hydrogen by interaction of the hydroxy compound with the silicon-hydrogen moieties. The hydrogen thus generated acts as a blowing agent to produce the foam.

Numerous types of hydroxy compounds have been employed in this method of preparing foam. Water and hydroxyaliphatic compounds, including alkanols, alkanediols and the like, are often preferred. However, it is usually important for water to be present as at least part of the blowing agent.

One problem encountered in the production of silicone foams by the above-described reaction is the short working life of the mixture after all reactants have been brought into contact. Even at room temperature, hydrosilylation and hydrogen generation occur almost immediately. Thus, it is generally not possible to prepare a one-part mixture which has a useful shelf life and which can later be converted into a silicone foam.

The use of microwave radiation for silicone foam preparation has been suggested. Reference is made, for example, to U.S. Pat. No. 4,026,844, in which an acetylenic alcohol is used as a catalyst inhibitor to increase the shelf life of the one-part foam-producing composition, so that reaction will take place only upon exposure to microwave energy. Other catalyst inhibitors, such as triarylphosphines and dialkyl maleates, are also known. However, they effectively inhibit only the hydrosilation step and not the foam-producing step. Thus, foam production can take place spontaneously before microwave activation, resulting in the formation of a non-crosslinked foamed product which does not have the desired properties.

It remains of interest, therefore, to develop silicone foam-producing compositions and methods which employ microwave energy for foam production and which permit delay of both hydrosilation and foaming until those operations can be simultaneously initiated by microwave activation. These effects are achieved by the present invention.

SUMMARY OF THE INVENTION

One aspect of the invention is a one-part composition convertible by microwave curing to a silicone foam, comprising a mixture of:

(A) at least one polyorganosiloxane wherein about 0.0002–3.0% by weight of the organo groups bonded to silicon are vinyl groups;

(B) 0.5–50 parts, per 100 pads of reagent A, of at least one hydride polysiloxane comprising organosiloxane units having one Si—H moiety and containing about 0.2–2.0% by weight hydrogen as Si—H groups;

(C) at least about 2 parts, per 100 parts of reagent A, of at least one active hydrogen compound selected from the group consisting of water and hydroxyaliphatic compounds, at least part of said active hydrogen compounds being water;

(D) as a catalyst, at least one cyclodextrin inclusion compound of a platinum group metal coordination complex in an amount effective to cause hydrosilylation of reagent A with reagent B and generation of hydrogen as a blowing agent; and (E) at least about 2%, based on said mixture, of at least one filler;

all parts and percentages being by weight.

Another aspect of the invention is a method for preparing a silicone foam which comprises exposing to microwave radiation a composition as described above.

DETAILED DESCRIPTION: PREFERRED EMBODIMENTS

Reagent A according to the present invention is at least one polyorganosiloxane having vinyl groups bonded to silicon. Such silicone materials are well known in the art and have been employed previously in the preparation of cured silicone materials, including foams. They are described, for example, in U.S. Pat. Nos. 4,418,157, 4,851,452 and 5,011,865, the disclosures of which are incorporated by reference herein.

A typical linear (polydiorganosiloxane) silicone material useful as reagent A is represented by the formula

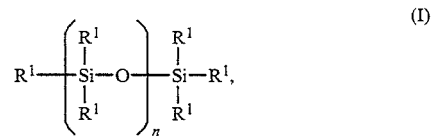

wherein each $R^1$ is independently $C_{1-6}$ alkyl, phenyl, 3,3,3-trifluoropropyl or vinyl and n has a value such that the viscosity of the silicone is in the range of about 100–1,000,000, preferably about 1,000–250,000 and most preferably about 2,500–100,000 centipoise at 25° C. Most often, each $R^1$ that is not vinyl is methyl.

An art-recognized convention for designating silicone structural units in accordance with the number of oxygen atoms attached to silicon is employed herein. That convention uses the letters M, D, T and Q to designate said number of oxygen atoms as abbreviations for "mono", "di", "tri" and "quatro". Thus, the silicone of formula I consists of M end groups and D internal units. The presence of T and/or Q units imparts branched and/or crosslinked structure to the compound. As further used herein, expressions such as "M(vinyl)" and "D(hydrogen)" denote an appropriate unit respectively having one vinyl group or one hydrogen atom attached to silicon.

The proportion of M, D, T and Q units in reagent A and in the mixture as a whole may be varied to afford a composition of the desired degree of branching and other properties. Thus, for example, the aforementioned U.S. Pat. No. 4,418,157 describes a base silicone material which may contain vinyl groups bonded to silicon and which has prescribed proportions of M, D and Q units.

For the purposes of the present invention, it is often preferred that at least about 20% by weight of reagent A comprise compounds with a high proportion of Q units. More specifically, the ratio of combined M and D units to Q units in such compounds is at most 2:1 and preferably about 1.5–2.0:1. Compounds having these proportions are highly crosslinked and/or three-dimensional in structure, and have the nature of silica-like molecular species which are organophilic. Such compounds may be prepared by art-recognized methods, such as the reaction of a silica hydrosol with an alkyl silicate or alkylchlorosilane containing one or more alkyl groups per molecule.

In general, reagent A comprises principally compounds in which vinyl groups are bonded to terminal silicon atoms on the silicone chain. The proportion of vinyl groups therein is in the range of 0.0002–3.0% and preferably 0.0002–0.1% by weight.

Reagent B may be represented by a linear polysiloxane of the formula

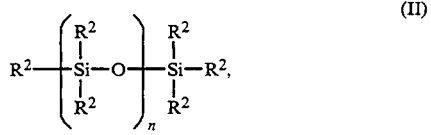

(II)

wherein each $R^2$ is independently $C_{1-6}$ alkyl, phenyl, 3,3,3-trifluoropropyl or hydrogen, the hydrogen comprising about 0.3–2.0% by weight thereof. Most often, reagent B has an average of at least about three Si—H moieties per molecule and an average of no more than one hydrogen atom bonded to any silicon atom, and any non-hydrogen $R^2$ values are methyl.

Reagent C is at least one active hydrogen compound selected from the group consisting of water and hydroxyaliphatic compounds, as previously mentioned, with at least part of reagent C being water. The use of hydroxyaliphatic compounds as part of reagent C is often preferred, since it results in the production of foam having low density.

The hydroxyaliphatic compounds may include alkanols such as methanol, ethanol, the butanols, the hexanols and the decanols, as well as alkanediols such as ethylene glycol, propylene glycol, tetramethylene glycol and 1,6-hexanediol. For purposes of safety concomitant with the preparation of low density foam of small cell size, it is often preferred to employ as reagent C a mixture of at least one alkanol and at least one alkanediol, both containing at least 5 and preferably 5–10 carbon atoms, since a foam of low density may thus be produced.

Reagent D is a latent catalyst which contains at least one platinum group metal. By "platinum group" is meant the portion of Group VIII of the Periodic Table, as traditionally identified, containing the metals rhodium, ruthenium, palladium, osmium, iridium and platinum. The preferred metals from this group are rhodium, palladium and platinum, with platinum being particularly preferred because of its relative availability and particular suitability.

The catalyst is prepared from a coordination complex of a platinum group metal, the term "coordination complex" designating a compound in which a ligand donates electrons to the metal atom. Numerous coordination complexes of platinum group metals are known; any such complex, especially those recognized as effective as hydrosilylation and foaming catalysts, may be employed for the preparation of the latent catalyst. Particularly suitable are the complexes with cyclic dienes, which undergo reaction with cyclodextrins to form inclusion compounds. Such inclusion compounds are described in U.S. Pat. Nos. 5,025,073, 5,089,582 and 5,106,939, the disclosures of which are incorporated by reference herein.

Among the cyclic dienes which may be employed for the preparation of the coordination complex are cyclopentadiene, 1,5-cyclooctadiene and norbornadiene, with the latter two being preferred and 1,5-cyclooctadiene being most preferred. Such complexes may be prepared by known methods from a platinum halide and the appropriate diene.

The cyclodextrin inclusion compound may be prepared from any cyclodextrin, examples being α-cyclodextrin, β-cyclodextrin and γ-cyclodextrin, with β-cyclodextrin often being preferred. Typically, the platinum-cyclic diene complex in crystalline form is added to a saturated aqueous solution of the cyclodextrin at a temperature in the range of about 20°–50° C., whereupon the inclusion compound precipitates. It may then be separated, washed with water to remove unreacted cyclodextrin and dried in vacuum. Unreacted platinum complex may be removed by washing the residue with a polar organic solvent such as tetrahydrofuran or methylene chloride.

Reagent E is at least one filler. Suitable fillers include reinforcing fillers such as fumed silica and precipitated silica and extending fillers such as ground quartz, titanium dioxide, zinc oxide, zirconium silicate, silica aerogel, iron oxide, diatomaceous earth, calcium carbonate, magnesium oxide, calcined clay and carbon (e.g., graphite or carbon black).

The use of silanols as sources for the hydrogen used as a blowing agent for the silicone foam is a feature of many previously known foam preparation methods. For the purposes of the present invention, however, it is strongly preferred that the foam-producing mixture be free from silanols, by reason of their tendency to increase the density of the foam.

The proportions of reagents B and C are about 0.5–50 and at least about 2 parts, respectively, per 100 parts of reagent A. The preferred proportion for reagent B is about 10–20 parts.

For optimum preparation of low density foam, it is preferred for reagent C to comprise about 40–80 mmol per 100 parts of the mixture, based on hydroxy groups, of at least one hydroxyaliphatic compound, with the balance being water. A blend of at least one monohydroxyaliphatic compound and at least one dihydroxyaliphatic compound, each containing at least 5 carbon atoms, is particularly preferred by reason of its relative safety of use and capability of producing low density foam of small cell size. The ratio of equivalents of said dihydroxyaliphatic to said monohydroxyaliphatic compound is usually about 1.5–4.0:1.

The presence of water as one of the constituents of reagent C is necessary for at least two reasons. First, it is an extremely active generator of hydrogen under the conditions of the invention. Second, under microwave curing conditions it aids in liberation of the active platinum catalyst species from the cyclodextrin inclusion compound, facilitating rapid catalysis of the hydrosilylation and foaming reactions.

The ratio of equivalents of diol to alkanol, when present, in reagent C is generally in the range of about 1.5–4.0:1, preferably about 1.8–3.5:1. At weight ratios lower than 1.5:1, silicone foams having a high density or a mean cell size greater than 0.6 mm. are typically produced. For the purposes of the invention, the equivalent weights of an alkanol and a diol are respectively its molecular weight and half its molecular weight.

Any amount of catalyst (reagent D) effective to catalyze hydrosilylation of reagent A with reagent B and formation of hydrogen as a blowing agent may be employed. Typically, an amount to provide about 10–140 and preferably about 25–75 pads of platinum per million parts of mixture is employed.

The proportion of filler (reagent E) in the mixture is at least about 2% and preferably about 20–30%.

It is generally preferred to have present in the foam-producing mixture at least about 5% of the combination of silica and silicon-containing compounds having a number ratio of M and D units combined to Q units of at most 2:1, preferably about 1.5–2.0:1. Compounds within this combined class include silica employed as filler (reagent E) and the aforementioned constituents of reagent A containing high proportions of Q units. They preferably comprise about 5–10% of the mixture. Their presence ensures provision of sufficient body in the foam after blowing.

The presence of other materials in the foam-forming composition is also contemplated. These may include flame retardation enhancing additives and catalyst inhibitors, the latter being illustrated by cyclic vinylsiloxanes and acetylenic alcohols.

Also present may be additives to reduce silicone foam density. These may include triarylphosphines or their complexes with platinum (the latter employed as pan of the catalyst), cyclic hydride polysiloxanes and aqueous buffer solutions having a pH in the range of about 2–10, with about 9–10 often being preferred. The buffer solution may also be the source of the water employed.

The above-described reagents and components may be blended in any desired order. It is often preferred to prepare an initial mixture comprising a major proportion of reagent A, water and filler, and to subsequently add catalyst followed by a mixture of reagents B, any alcohol present as pan of reagent C and a minor proportion of reagent A. Thus, the designation of more than one compound as a specific reagent does not require that all of said compounds be introduced together or even at the same time.

According to the present invention, the above-described mixture is exposed to microwave radiation, whereupon curing and hydrogen generation occur and the foam is produced. By "microwave" is meant radiation with a frequency of at least 0.9 gigahertz, most often 0.9–100 and especially 0.9–10 gigahertz.

The microwave radiation may be produced by conventional methods, as illustrated by conventional microwave ovens typically operating at a power in the range of about 500–6000 watts. Exposure to said microwave radiation for a period of about 1 minute is usually adequate to produce the foam.

As previously mentioned, many inhibitors of platinum group catalysts are known but said inhibitors typically inhibit only the hydrosilylation reaction, permitting foaming to proceed. It was unexpected, therefore, to discover that the employment as a catalyst of a cyclodextrin inclusion compound of a platinum-cyclic diene complex results in the formation of a mixture in which both hydrosilylation and foaming are inhibited until microwave activation takes place.

The invention is illustrated by the following examples. Pans and percentages are by weight unless otherwise indicated. All organic groups bonded to silicon are methyl unless otherwise indicated.

EXAMPLE 1

The following materials were blended in a blender to yield a viscous mixture:

$M_{1.4}D(vinyl)_{0.25}Q$ resin-18.75 parts;
$M(vinyl)D_xM(vinyl)$ fluid having a viscosity of 4000 centipoise-15 parts;
$M(vinyl)D_xM(vinyl)$ fluid having a viscosity of 80,000 centipoise-41.25 parts;
Calcium carbonate-2 parts;
$\alpha$-Quartz filler-25 parts;
Water-1.5 parts.

An inclusion compound was prepared by contacting an aqueous solution of 3.1 parts of $\beta$-cyclodextrin with 1 gram of a platinum(II)-1,5-cyclooctadiene complex for three hours, isolating the resulting precipitate, washing it with water, drying, washing with methylene chloride and again drying.

To 20 parts of the viscous mixture was added, with stirring, 23 mg. of the inclusion compound. There was then added a homogeneous mixture of 0.67 part of a $M(vinyl)D_xM(vinyl)$ fluid having a viscosity of 80,000 centipoise and 1.33 parts of a $MD(hydrogen)_xM$ fluid containing about 1.6% silicon-bonded hydrogen and 1.3% T units. No foam formation was noted after the resulting mixture had stood for 20 minutes at room temperature. It was then placed in a 900 watt microwave oven and microwaved at 100% power for about 2.5 minutes, whereupon a tack-free, resilient foam having a density of 0.271 g/cm$^3$ was produced.

A first control sample was prepared by the same method except that the inclusion compound was replaced by a catalyst prepared by the reaction of chloroplatinic acid with tetramethylvinyldisiloxane in the presence of sodium bicarbonate, as disclosed in U.S. Pat. No. 3,775,452, dissolved in xylene to a level of about 5% platinum. Said catalyst was added in the amount of 40 ppm of platinum in the mixture. Upon standing in a vessel for 3 minutes, a foamed material formed and rose to 2–3 cm. above the lip of the vessel.

Two other controls are prepared in which the inclusion compound is replaced respectively by triphenylphosphine- and 1-ethynyl-1-cyclohexanol-inhibited platinum catalysts of the type used in the first control. In each case, foaming is noted upon storage prior to microwaving. After microwave curing, the products are hard, non-resilient foam materials.

EXAMPLE 2

The procedure of Example 1 was repeated, except that the mixture was microwaved immediately after preparation. The product was a resilient foam having a density of 0.309 g/cm$^3$.

EXAMPLE 3

The following materials were blended in a dual planetary mixer:

$M_{1.4}D(vinyl)_{0.25}Q$ resin-18.25 parts;
$M(vinyl)D_xM(vinyl)$ fluid having a viscosity of 4000 centipoise-15 parts;
$M(vinyl)D_xM(vinyl)$ fluid having a viscosity of 80,000 centipoise-39.75 parts;
Aqueous buffer solution containing 0.25% sodium carbonate and 0.209% sodium bicarbonate-1.5 parts;

α-Quartz filler-25 parts.

To 20 parts of the viscous mixture thus obtained, in a 100-ml. plastic cup, was added the inclusion compound of Example 1 in the amount of 80 ppm of platinum based on the final mixture, and the mixture was stirred by hand for 2 minutes. There was then added a homogeneous mixture of 0.67 part of a M(vinyl)$D_x$M(vinyl) fluid having a viscosity of 80,000 centipoise, 1.33 parts of a MD(hydrogen)$_x$M fluid in which x was about 20 and the silicon-bonded hydrogen content was about 1.6%, and a homogeneous blends of 1-hexanol and 1,6-hexanediol in a ratio of equivalents of 1:3 to provide a hydroxy content of 56.8 milliequivalents per 100 parts of mixture. Hand mixing was continued for 30 seconds, after which time no foam formation was noted. Upon microwave curing as in Example 1, a resilient foam having a density of 0.180 g/cm$^3$ and an average cell size of 0.60 mm. was produced.

What is claimed is:

1. A method for preparing a silicone foam which comprises exposing to microwave radiation a composition comprising a mixture of:
    (A) at least one polyorganosiloxane wherein about 0.0002–3.0% by weight of the organo groups bonded to silicon are vinyl groups;
    (B) 0.5–50 parts, per 100 parts of reagent A, of at least one hydride polysiloxane comprising organosiloxane units having one Si—H moiety and containing about 0.2–2.0% by weight hydrogen as Si—H groups;
    (C) at least about 2 parts, per 100 parts of reagent A, of at least one active hydrogen compound selected from the group consisting of water and hydroxyaliphatic compounds, at least part of said active hydrogen compounds being water;
    (D) as a catalyst, at least one cyclodextrin inclusion compound of a platinum group metal coordination complex in an amount effective to cause hydrosilylation of reagent A with reagent B and generation of hydrogen as a blowing agent; and
    (E) at least about 2%, based on said mixture, of at least one filler;
    all parts and percentages being by weight.

2. A method according to claim 1 which is free from silanols.

3. A method according to claim 2 wherein the coordination complex is a cyclic diene complex of platinum, palladium or rhodium.

4. A method according to claim 3 wherein the coordination complex is a platinum complex.

5. A method according to claim 4 wherein the cyclic diene is 1,5-cyclooctadiene.

6. A method according to claim 4 wherein each organo group in reagent A which is not vinyl is methyl and each organo group in reagent B is methyl.

7. A method according to claim 6 wherein reagent A comprises principally compounds in which vinyl groups are bonded to terminal silicon atoms on the silicone chain.

8. A method according to claim 4 wherein reagent C is a mixture of water and about 40–80 mmol per 100 parts of said mixture, based on hydroxy groups, of at least one hydroxyaliphatic compound.

9. A method according to claim 8 wherein reagent C comprises a blend of at least one monohydroxyaliphatic compound and at least one dihydroxyaliphatic compound, each containing at least 5 carbon atoms.

10. A method according to claim 8 wherein the ratio of equivalents of dihydroxyaliphatic to monohydroxyaliphatic compound in reagent C is in the range of about 1.8–3.5:1.

* * * * *

UNITED STATES PATENT AND TRADEMARK OFFICE
CERTIFICATE OF CORRECTION

PATENT NO. : 5,438,081

DATED : August 1, 1995

INVENTOR(S) : Larry N. Lewis et al.

It is certified that error appears in the above-identified patent and that said Letters Patent is hereby corrected as shown below:

Title page, item 21, "325,913" should read --325,918--. Column 2, line 1, "pads" should read --parts--. Column 5, line 11, "pads" should read --parts--; line 43, "pan" should read --part--.

Column 2, line 1, "pans" should read --parts--.

Signed and Sealed this

Twelfth Day of December, 1995

*Attest:*

*Attesting Officer*

BRUCE LEHMAN

*Commissioner of Patents and Trademarks*